United States Patent
Dodds et al.

(10) Patent No.: US 10,272,504 B2
(45) Date of Patent: Apr. 30, 2019

(54) TOOL WITH RIGHT-HAND AND LEFT-HAND CUTTING FEATURES EXTENDING ALONG THE FULL LENGTH OF THE CUTTING ZONE

(71) Applicant: SANDVIK INTELLECTUAL PROPERTY AB, Sandviken (SE)

(72) Inventors: Jason Ray Dodds, Simpsonville, SC (US); Sidney Toomes, Greer, SC (US); Cody David Cluff, Taylors, SC (US)

(73) Assignee: SANDVIK INTELLECTUAL PROPERTY, Sandviken (SE)

( * ) Notice: Subject to any disclaimer, the term of this patent is extended or adjusted under 35 U.S.C. 154(b) by 283 days.

(21) Appl. No.: 15/013,074

(22) Filed: Feb. 2, 2016

(65) Prior Publication Data
US 2017/0216936 A1 Aug. 3, 2017

(51) Int. Cl.
*B23C 5/10* (2006.01)
*B23P 15/34* (2006.01)

(52) U.S. Cl.
CPC ............... *B23C 5/10* (2013.01); *B23P 15/34* (2013.01); *B23C 2210/045* (2013.01); *B23C 2210/0428* (2013.01); *B23C 2210/0457* (2013.01); *B23C 2210/0492* (2013.01); *B23C 2210/54* (2013.01); *B23C 2226/27* (2013.01); *B23C 2228/10* (2013.01)

(58) Field of Classification Search
CPC .... B23C 5/10; B23C 5/12; B23C 5/14; B23C 2210/24; B23C 2210/241; B23C 2210/245; B23C 2210/287; B23C 2210/28; B23C 2210/54; B23C 2210/44; B23C 2210/445; B23P 15/34
See application file for complete search history.

(56) References Cited

U.S. PATENT DOCUMENTS

| | | | | | |
|---|---|---|---|---|---|
| 62,123 | A | * | 2/1867 | Elgin | ........................ B23C 5/14 407/62 |
| 3,058,199 | A | * | 10/1962 | Cave | ........................ B23C 5/10 144/218 |

(Continued)

FOREIGN PATENT DOCUMENTS

| DE | 289231 A5 | 4/1991 |
|---|---|---|
| DE | 102010029445 A1 | 12/2011 |

(Continued)

*Primary Examiner* — Will Fridie, Jr.
(74) *Attorney, Agent, or Firm* — Corinne R. Gorski (57) ABSTRACT

Rotatable, solid cutting tool with both right-hand spirals and left-hand spirals, each of which includes an interrupted cutting edge having individual cutting edges. Individual cutting edges of the right hand spirals are axially staggered helically around a circumference of a cutting portion with respect to individual cutting edges of the left hand spirals so that, at each axial position along an axial length of the cutting portion, each radial cross-section includes both at least one individual cutting edge on a right hand spiral and at least one individual cutting edge on a left hand spiral. Individual cutting edges have a length along an outer circumference of the cutting tool that is the same for individual cutting edges of the right hand spiral and individual cutting edges of the left hand spirals. Cutting edges on differently handed spirals are both right handed cutting edges or both left handed cutting edges.

20 Claims, 5 Drawing Sheets

(56) References Cited

U.S. PATENT DOCUMENTS

| | | | |
|---|---|---|---|
| 4,990,035 A * | 2/1991 | Scheuch | B23C 5/10 |
| | | | 407/29.13 |
| 6,179,616 B1 * | 1/2001 | Danger | A61C 3/02 |
| | | | 433/165 |
| 6,234,725 B1 * | 5/2001 | Campian | B23C 5/1009 |
| | | | 407/54 |
| 7,090,442 B2 | 8/2006 | Ahrnkiel | |
| 9,174,287 B2 * | 11/2015 | Shpigelman | B23C 5/10 |
| 9,227,253 B1 * | 1/2016 | Swift | B23C 5/28 |
| 2003/0152432 A1 | 8/2003 | Meece et al. | |
| 2005/0123363 A1 * | 6/2005 | Ahrnkiel | B23C 5/10 |
| | | | 407/53 |
| 2010/0143055 A1 | 6/2010 | Kleiner et al. | |
| 2013/0209184 A1 | 8/2013 | Barry | |
| 2015/0093204 A1 | 4/2015 | Raynor | |
| 2015/0147127 A1 | 5/2015 | Shpigelman et al. | |
| 2015/0251253 A1 * | 9/2015 | Hufschmied | B23B 51/08 |
| | | | 407/29.13 |
| 2017/0266739 A1 * | 9/2017 | Yamasaki | B23C 5/10 |

FOREIGN PATENT DOCUMENTS

| | | |
|---|---|---|
| FR | 2972122 A1 | 3/2004 |
| FR | 2972122 A1 | 9/2012 |

* cited by examiner

FIG. 17C

TOOL WITH RIGHT-HAND AND LEFT-HAND CUTTING FEATURES EXTENDING ALONG THE FULL LENGTH OF THE CUTTING ZONE

FIELD OF THE DISCLOSURE

The present disclosure relates to cutting tools that have both right-hand and left-hand cutting features. More specifically, the present disclosure relates to cutting tools such as trim and rout tools, that have both a right-hand spiral (RHS) with a cutting edge and a left-hand spiral with a cutting edge (LHS), each of which extend along the full length of the cutting zone of the tool. The cutting edges on the two spirals are typically of the same handedness—being either both right handed cutting edges (RHC) or left-handed cutting edges (LHC). Cutting tools with the disclosed features can be used in machining, for example, in both trim and rout applications of carbon fiber reinforced plastic (CFRP) materials, and provide optimal finish, delamination and running parameters.

BACKGROUND

In the discussion that follows, reference is made to certain structures and/or methods. However, the following references should not be construed as an admission that these structures and/or methods constitute prior art. Applicants expressly reserve the right to demonstrate that such structures and/or methods do not qualify as prior art against the present invention.

There are several conventional cutting tools for both trim and rout operations of materials, including for CFRP materials. However, these conventional cutting tools have weaknesses in the noted operations.

One type of conventional cutting tool is a helical endmill. Helical endmills consist of either right hand (RH) or left hand (LH) cutting edges, can be used for roughing or finishing, and typically produces a good finish. However, the cutting edges are only in one direction and can negatively impact the cutting operation by, for example, delamination of the part.

Another type of conventional cutting tool is a serration router. Serration routers contain either RH or LH cutting edges with opposing serrations similar to a roughing endmill. However, serration routers can produce delamination one side.

Another type of conventional cutting tool is a helical burr, which consists of shallow RH and LH flutes that create small pyramid type cutting edges. However, helical burrs produce varying results depending on the makeup and direction of fibers in the CFRP workpiece.

A further type of conventional cutting tool is a compression endmill with, in separate areas along the length of the cutter, RH cutting edges and LH cutting edges, which together produce compression in the workpiece to reduce delamination. However, the limited cutting zone reduces the versatility and usefulness of this tool.

Aspects of conventional cutting tool are disclosed in FR 2 972 122, U.S. Pat. No. 7,090,442 and U.S. Patent Publication Nos. 2013/0209184 and 2015/0093204.

SUMMARY

In place of the currently used conventional cutting tools for both trim and rout operations of materials, including for CFRP materials, a trim and rout cutter has been developed that has both left hand and right hand cutting features that extend the full length of the cutting zone. The combination of left hand and right hand cutting features create a compression cut over the length of the cutting tool where the left hand and right hand cutting features are present. The compression cut generates a compression force in the workpiece material that is advantageous to prevent delamination in the workpiece. The presence of the compression cut and the attendant compression force along the full length of the cutting zone allows the cutting tool to be used to machine work pieces of varying thickness and contour as well as allows extended use of the cutting tool over multiple cuts before the cutting tool needs to be exchanged.

Disclosed cutting tools have a cutting zone with a compression cut that is maximized in length to allow use of the cutting tool in workpieces that have non-uniform thicknesses and contour (as long as the range of thicknesses are still within the values that correspond to no more than the length of the cutting zone) to minimize having to use different cutting tools with particularized cutting zones with compression cut with compression forces correlated to the various thicknesses of the workpiece.

Disclosed cutting tools have deep gullet flutes in both the right hand direction and the left hand direction to allow optimal chip evacuation. This allows the cutting tool to be used both in shallow trim cuts and in fully engaged roughing cuts.

The trim and rout cutter is a solid carbide cutter or a carbide coated cutter. The disclosed cutting tool can be, for example, an end mill, a roughing end mill, a trimmer, a router, a compression router, a serration router, or a burr.

In general, exemplary embodiments of a cutting tool comprise a solid body including a cutting portion and a shank portion. The cutting portion and shank portion are sequentially arranged along a longitudinally-extending axis of rotation of the solid body with the cutting portion toward a front end of the cutting tool and the shank portion toward a rear end of the cutting tool. The cutting portion includes a first type of cutting feature and a second type of cutting feature, wherein the first type cutting features include a plurality of right hand spirals and the second type of cutting feature includes a plurality of left hand spirals. Each of the plurality of right hand spirals includes an interrupted cutting edge having a plurality of individual cutting edges and each of the plurality of left hand spirals includes an interrupted cutting edge having a plurality of individual cutting edges. A longitudinal length of the cutting portion is defined by a length, in a direction parallel to the longitudinally-extending axis of rotation of the solid body, in which the plurality of right hand spirals intersect with the plurality of left hand spirals. Individual cutting edges of each of the plurality of right hand spirals are axially staggered helically around a circumference of the cutting portion with respect to the individual cutting edges of each of the plurality of left hand spirals so that, at each axial position along an axial length of the cutting portion, each radial cross-section includes both at least one individual cutting edge on a right hand spiral and at least one individual cutting edge on a left hand spiral. Individual cutting edges on each of the plurality of right hand spirals and the plurality of left hand spirals have a length along an outer circumference of the cutting tool, and the length of the individual cutting edges of each of the plurality of right hand spirals equals the length of the individual cutting edges of each of the plurality of left hand spirals.

An exemplary method to manufacture a rotatable, solid cutting tool comprises forming a solid body of tungsten carbide, cutting the solid body to a desired length, grinding the solid body to a desired diameter; and grinding a first type of cutting feature and a second type of cutting feature into a cutting portion of the cutting tool. Grinding of the cutting features includes forming one or more of a flute, a rake surface, and a clearance surface of the individual cutting edges.

An exemplary method of machining a workpiece made of carbon fiber reinforced plastic comprises installing a rotatable, solid cutting tool into a holder of a machine tool and measuring for initial tool position, mounting a workpiece in the machine tool and measuring for initial workpiece position, operating the machine tool to rotate the cutting tool about the longitudinally-extending axis of rotation at a desired RPM, engaging the workpiece with the rotating cutting tool to remove material from the workpiece, and translating the rotating cutting tool relative to the workpiece along predetermined path at a set feed rate to form the workpiece into a desired shape.

BRIEF DESCRIPTION OF THE DRAWINGS

The following detailed description of preferred embodiments can be read in connection with the accompanying drawings in which like numerals designate like elements and in which.

DETAILED DESCRIPTION

Figures 1, 2, 3, 4:
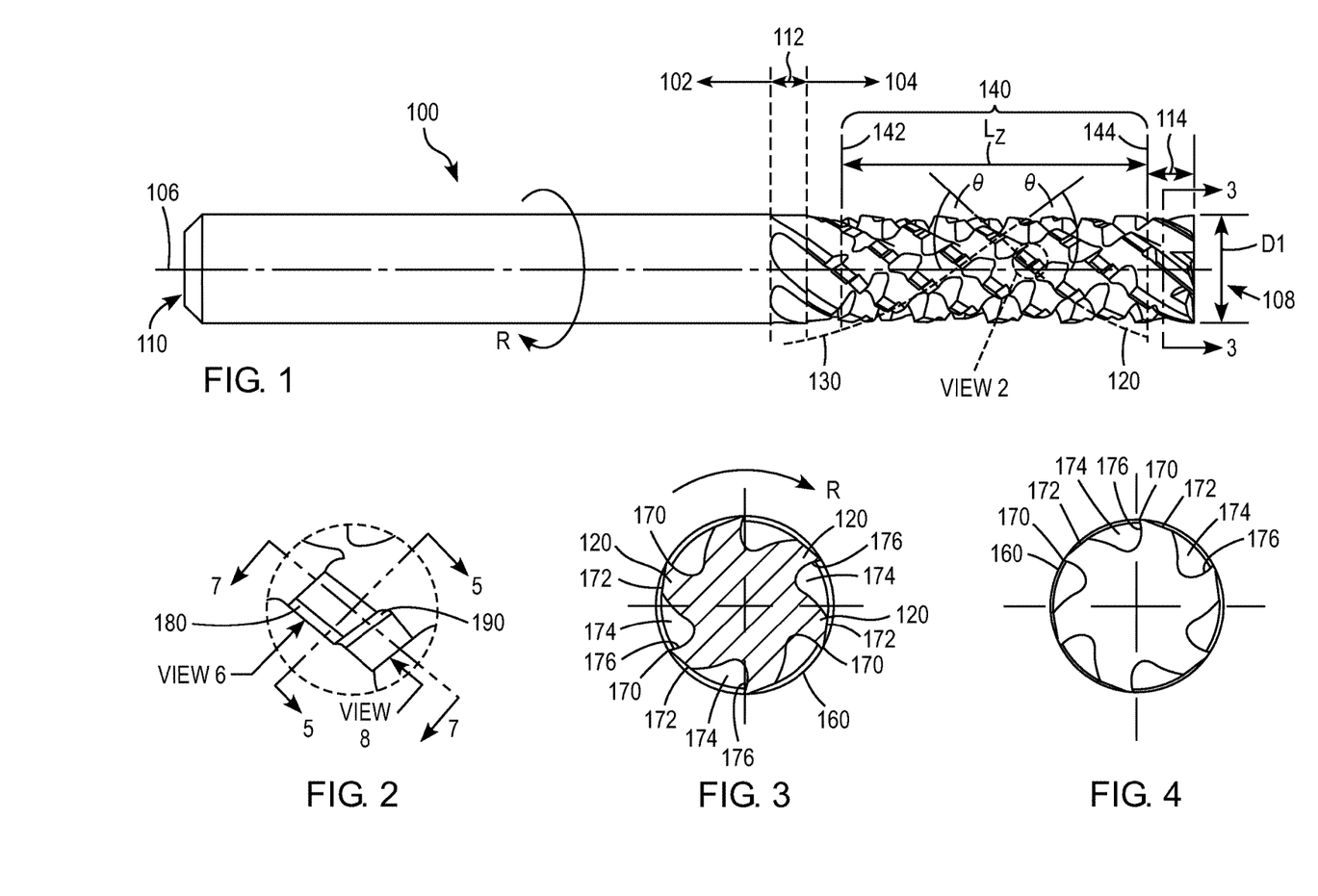
FIG. 1 shows a side view of a first exemplar embodiment of a cutting tool for both trim and rout operations of materials with two types of cutting features that extend the full length of the cutting zone and with a plain end point type (also sometimes called a flat end point type or non-cutting end type).
FIG. 2 shows, in a magnified surface view, details of the cutting teeth of the two types of cutting features on the cutting tool in FIGS. 1.
FIG. 3 is an axial view in a first direction down the longitudinal rotation axis of the cutting tool in FIG. 1 showing the cross-section of the cutting tool along line 3-3 shown in FIG. 1.
FIG. 4 is an axial view in a second direction down the longitudinal rotation axis of the cutting tool in FIG. 1 showing the features of the plain end point type.

FIG. 1 illustrates an exemplar rotatable, solid cutting tool 100 in the form of a rout and trim cutter. The exemplar cutting tool 10 comprises a solid body including a shank portion 102 and a cutting portion 104. The cutting portion 104 and shank portion 102 are sequentially arranged along a longitudinally-extending axis of rotation 106 of the solid body with the cutting portion 104 toward a front end 108 of the cutting tool 100 and the shank portion 102 toward a rear end 110 of the cutting tool 100. In the FIG. 1 embodiment (and other figures related to FIG. 1), the solid cutting tool 100 has its features arranged for right hand rotation (R) of the tool 100 about the longitudinal rotation axis 106 of the cutting tool 100.

The shank portion 102 is cylindrical with constant diameter along its axial length. Typically, the shank portion 102 has a smooth surface along a majority of the axial length. While the diameter of the shank portion 102 can be any suitable size for the intended machining operation, typical diameters are ⅛ inch to ½ inch or 6-12 mm, alternatively, ⅜ inch or 10 mm. Additionally, an optional mounting feature can be included at the rear end 110 of the cutting tool 100. Mounting features can include structures to mate or install the cutting tool 100 in a machine tool, such as a CNC machine, for use in machining workpieces. As one example, the mounting feature can be flat surfaces arranged as an n-sided shape, e.g., a triangle, a quadrilateral, a pentagram and a hexagon, or other suitable shape that can be held in the jaws of a chuck or coupling.

The cutting portion 104 is axially forward of the shank portion 102. Typically, the cutting portion 104 is sequentially adjacent to the shank portion 102, although an optional transition area 112 may be located between the shank portion 102 and the cutting portion 104 and by which the shank portion 102 joins with or transitions into the cutting portion 104. Thus, the cutting portion 104 extends from the shank portion 102 (and transition area 112, if present) forward toward a tip region 114 of the cutting tool 100 located at an axially distally forward end.

The transitions of the shank portion 102 into the cutting portion 104 can include transitions in size, such as diameter, as well as transitions in cutting features, such as the inclusion of one or more cutting features. The inclusion of one or more cutting features can include one or more of including fewer or more numbers of cutting features and including smaller or larger sizes of cutting features, both of which can be included as a function of axial position. If present, the transitions in number and size of cutting features will typically increase as position in the transition area 112 moves axially forward from the shank portion 102 to the cutting portion 104, while transitions in size, such as diameter, will typically increase as position in the transition area 112 moves axially rearward from the cutting portion 104 to the shank portion 102.

Returning to the cutting portion 104, the cutting portion 104 has a circumference that includes two types of cutting features. A first type of cutting feature includes a right hand spiral (RHS) 120 with an interrupted cutting edge (ICE). A second type of cutting feature includes a left hand spiral (LHS) 130 with an interrupted cutting edge (ICE). FIG. 2 is a magnified side view of a portion of the cutting tool in FIG. 1 and shows details of the first type of cutting feature and second type of cutting feature. The right hand spiral (RHS) 120 and left hand spiral (LHS) 130 are both helicoidal structures that extend, respectively, right or left around the circumference of the cutting tool 100 (looking down the axis of rotation 106 from the rear end 110 of the cutting tool toward the front end 108), i.e., a right hand spiral (RHS) 120 is a clockwise helicoidal structure and a left hand spiral (LHS) 130 is a counter-clockwise helicoidal structure.

The helicoidal structures of the right hand spiral (RHS) 120 and left hand spiral (LHS) 130 have a pitch in opposite directions and intersect each other at periodic locations as the right hand spiral (RHS) 120 and left hand spiral (LHS) 130 cross. At the intersection points (an example of which is shown in FIG. 2), the structure of a first of the spirals occupies the space in the second of the spirals that would otherwise be the cutting features in that space, i.e., the cutting edge, the rake surface and the flute space below the rake surface, resulting in there being an interruption in the cutting edges formed on the respective spirals at the intersection point. The interruption or absence of the cutting edges is periodic along the length of the respective spirals and results in an interrupted cutting edge (ICE). An interrupted cutting edge (ICE) is a cutting edge that is non-continuous along the length of the right hand spiral (RHS) 120 or left hand spiral (LHS) 130 and includes a plurality of individual cutting edges that are separated from each other along the spiral. Here, the cutting edge is, alternately, in sequence along the length of the spiral: an individual cutting edge—an intersection point without a cutting edge—an individual cutting edge—an intersection point without a cutting edge—and so forth. Both the right hand spiral (RHS) 120 and left hand spiral (LHS) 130 have an interrupted cutting edge (ICE) as their respective cutting edge.

The portion of the tool in which the overlap of the right hand spiral (RHS) 120 and left hand spiral (LHS) 130 occurs defines a cutting zone 140. For example, and as shown in FIG. 1, the axially rearwardmost intersection point of the right hand spiral (RHS) 120 and left hand spiral (LHS) 130 defines a rearward boundary 142 and the axially forwardmost intersection point of the right hand spiral (RHS) 120 and left hand spiral (LHS) 130 defines a forward boundary 144. The axially rearwardmost intersection point and the axially forwardmost intersection point are axially separated by a length ($L_Z$) (the length measured in a direction parallel to the longitudinally-extending axis of rotation 106 of the solid body), and the cutting zone 140 between the rearward boundary 142 and the forward boundary 144 also has length ($L_Z$). In addition, because of the helicoidal nature of the right hand spiral (RHS) 120 and left hand spiral (LHS) 130, the axially rearwardmost intersection point and the axially forwardmost intersection point may not be in the same circumferential position (relative to a cross-section of the solid body perpendicular to the longitudinally-extending axis of rotation of the solid body), but rather may be at different circumferential positions. As such, the axially rearwardmost intersection point and the axially forwardmost intersection point may not both be visible at the same time in a side view such as FIG. 1.

In exemplary embodiments, the length ($L_Z$) of the cutting zone between the rearward boundary 142 and the forward boundary 144 has a value that is related to the diameter (D1) of the cutting tool 100. For example, the length ($L_Z$) of the cutting zone 140 between the rearward boundary 142 and the forward boundary 144 can range from (1×diameter of cutting tool) to (10×diameter of cutting tool), alternatively (6×diameter of cutting tool). The diameter (D1) of the cutting tool 100 and the length of the cutting portion 104 and the cutting zone 140 can be any suitable size for the intended machining operation. Typical diameters for the cutting tool are ⅛ inch to ½ inch or 6-12 mm, alternatively, ⅜ inch or 10 mm. While the range of sizes of the diameter for the cutting portion 104 may be the same as the range of sizes of the diameter of the shank potion 102, the diameter of the cutting portion 104 can be the same as or be different from the diameter of the shank portion 102. In the later case, then the length ($L_Z$) of the cutting zone 140 between the rearward boundary 142 and the forward boundary 144 can range from (1×diameter of cutting tool in the cutting zone) to (10× diameter of cutting tool in the cutting zone), alternatively (6×diameter of cutting tool in the cutting zone).

The right hand spiral (RHS) 120 and left hand spiral (LHS) 130 extend over an axial length of the tool 100 commensurate with the cutting zone 140. Additionally, the left hand spiral (LHS) 130 extends axially rearward of the rearward boundary 142 and the depth of the flute of the left hand spiral (LHS) 130 reduces in depth as the left hand spiral (LHS) 130 moves axially rearward from the rearward boundary 142. This produces a suitable rake angle at the end of the left hand spiral (LHS) 130 in the rearward portion of the cutting zone 140 to efficiently cut material with the cutting edge of the left hand spiral (LHS) 130 and also to efficiently transport cut material. Typically, customer specific characteristics can be accommodated and can depend on the workpiece external layers, machine capabilities, suction capability, and customer preferences. Also additionally, the right hand spiral (RHS) 120 extends axially forward of the forward boundary 144 into the tip region 114 located at an axially distally forward end of the cutting tool 100. This area of the cutting edge is typically used to drill through the workpiece material. The left hand spiral (LHS) 130 does not extend axially forward of the forward boundary because if it were to do so, the left hand spiral (LHS) 130 would interfere with or remove the cutting features of the right hand spiral (RHS) 120 in the tip region 114 and at the axially distally forward end of the cutting tool 100 with attendant detrimental effects on cutting performance and chip evacuation performance of the tip region 114 during machining operations. In one example, the length of the tip region 114 from the forward boundary 142 to the forward end 108 of the cutting tool 100 is 2 to 6 mm. FIG. 3 is a cross-section along line 3-3 in FIG. 1 and shows that, in this part of the cutting tool axially forward of the forward boundary 144, only the right hand spirals (RHS) 120 and associated cutting features are present.

The individual cutting edges in both the cutting zone 140 and in the part of the cutting tool 100 axially forward of the forward boundary 144 are located on an outer diameter surface 160 of the radial cross-section of the tool 100. In FIG. 3, individual right hand spirals (RHS) 120 are illustrated each with a cutting edge 170 at a radially outermost diameter 160 of the cutting tool 100 and followed by a clearance surface 172 that is radially inward from the outer diameter surface 160 of the radial cross-section of the tool 100. Following the clearance surface 172, the surface of the right hand spiral (RHS) 120 transitions into the flute 174 for the following (relative to the direction of rotation for machining operations) cutting edge. The surface of the flute 174 transitions into a rake surface 176 that meets the clearance surface 172 of the following (relative to the direction of rotation for machining operations) right hand spiral (RHS) to form the cutting edge of the following (relative to the direction of rotation for machining operations) right hand spiral (RHS).

FIG. 4 is axial view down the longitudinal rotation axis 106 of the cutting tool 100 in FIG. 1 as seen from the axially distally forward end 108 and showing the features of a plain end point type. In the FIG. 4 view, the individual cutting edges 120 (which are right handed cutting edges (RHC) on right hand spirals (RHS)) are each located on an outer diameter surface 160 of the radial cross-section of the tool and this outer diameter surface 160 is on a cylindrically-shaped circumference. For a tool 100 rotating in the clockwise direction during operation (which is the counterclockwise direction in FIG. 4), each individual spiral has a cutting edge geometry that includes the individual cutting edge 170 followed by clearance surface 172 that is radially inward from the outer diameter surface 160 of the radial cross-section of the tool 100. Following the clearance surface 172, the cutting edge geometry transitions into the flute 174 for the following (relative to the direction of rotation for machining operations) cutting edge. The surface of the flute 174 transitions into a rake surface 176 that meets the clearance surface 172 of the cutting edge geometry of the following (relative the direction of rotation for machining operations) right hand spiral (RHS) to form the cutting edge 170 in the cutting edge geometry of the following (relative to the direction of rotation for machining operations) right hand spiral (RHS).

For ease of view, not all features of each spiral are labeled with reference numerals in FIGS. 3 and 4.

Each individual cutting edge has a length on the outer circumference surface of the tool. FIGS. 5-8 show, in a magnified surface view or cross-sectional view, details of cutting teeth on the cutting tool in FIG. 1 in the views as indicated in FIG. 2. The illustrated cutting teeth are a right handed cutting edge 180 on a right hand spiral 120 (RHC-RHS) (cross-section 5-5 and view 6 shown in corresponding FIGS. 5-6) and a right handed cutting edge 190 on a left hand spiral 130 (RHC-LHS) (cross-section 7-7 and view 8 shown in corresponding FIGS. 7-8). As a surface view, FIGS. 2-8 illustrate that both the right handed cutting edge 180 on the right hand spiral 120 (RHC-RHS) and the right handed cutting edge 190 on the left hand spiral 130 (RHC-LHS) are contained in the cylindrically-shaped circumferential surface of the cutting tool corresponding to the outer diameter surface of the radial cross-section of the tool. As observable from the figures, the individual cutting edges 180,190 also are each approximately parallel (90°±3°) to the helicoidal axis of the respective right hand spiral (RHS) 120 or left hand spiral (LHS) 140 and have a length along an outer circumference of the cutting tool 100. In exemplar embodiments, the length of each of the plurality of right handed cutting edge on the right hand spiral ($L_{RHC,\ RHS}$) and the length of each of the plurality of right handed cutting edges on the left hand spiral ($L_{RHC,\ LHS}$) are equal within a given tolerance band, such as within ±2%, alternatively within ±1%.

Both the right hand spiral (RHS) 120 and the left hand spiral (LHS) 130 have a helix angle, which is the angle formed between a line drawn parallel to the axis of the drill 106 and the leading edge of the land. This helix angle is generally represented by helix angle (θ) in FIG. 1. In exemplary embodiments, the helix angle (θ) for both the right hand spiral (RHS) 120 and the left hand spiral (LHS) 130 can range from 10 degrees to 60 degrees, alternatively, 40±10 degrees, 40±2 degrees or 40±1 degrees. The smaller the spiral to spiral variation, the more precise the cutting tool can cut and the better the surface finish of the cut. Although the helix angle (θ) for the right hand spiral (RHS) 120 can be the same as the helix angle (θ) for the left hand spiral (LHS) 130, it does not have to be.

Collectively for both the right hand spiral (RHS) 120 and the left hand spiral (LHS) 130, the respective individual cutting edges 180,190 are axially staggered helically around the circumference of the cutting zone 140. The staggering is a result of the bi-directional spirals, i.e., the RHS and LHS, and the interrupted cutting edges that are present in the cutting tool. Because of the staggering, in each radial cross-section along the axial length of the cutting zone 140, there is both at least one right handed cutting edge 180 on a right hand spiral 120 (RHC-RHS) and also at least one right handed cutting edge 190 on a left hand spiral 130 (RHC-LHS). The actual number of right handed cutting edges on a right hand spiral (RHC-RHS) and right handed cutting edges on a left hand spiral (RHC-LHS) will vary depending on the number of right hand spirals and left hand spirals and their helix angles and spacing.

Moreover, in addition to be axially staggered, at least a portion of a right hand cutting edge on a first spiral overlaps at least a portion of right hand cutting edge on a second, consecutively adjacent, spiral, where the first spiral and the second spiral are of the same type, i.e., the spirals with the overlapping cutting edges are of the same type of cutting feature—either both right hand spirals or both left hand spirals. The overlap typically occurs between an axially rearwardmost portion of a first right hand cutting edge on a first spiral and an axially forwardmost portion of a second right hand cutting edge on a second spiral (the first and second spirals being either both right hand spirals or both left hand spirals), where the two spirals are consecutively adjacent (amongst those on the same type of cutting feature) and, in a radial cross-section containing the overlapping portions of the two cutting edges, the first spiral is located to the left of or counterclockwise from the second spiral (looking down the axis of rotation from the rear end of the cutting tool toward the axial distally forward end).

Exemplary rotatable, solid cutting tools can have a different number of right hand spirals (RHS) and left hand spirals (LHS), which allows distribution of cutting forces, heat, and chip evacuation. A different number of right hand spirals (RHS) and left hand spirals (LHS) can be present depending on machine limitations, rigidness, and workpiece variations and to achieve desired results for cutting performance.

Figure 5:
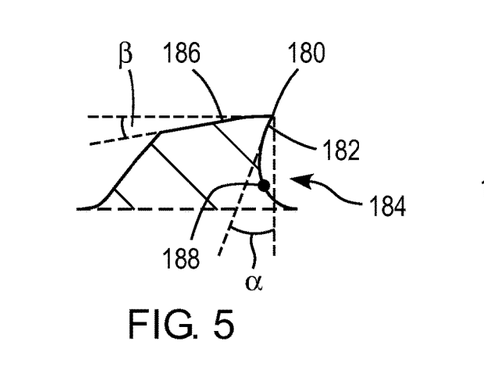
FIGS. 5 and 6 are magnified views showing, respectively, a cross-section of a first cutting edge along the line 5-5 (FIG. 5) and a side, surface view of view 6 (FIG. 6) shown in FIG. 2.
Figure 6:
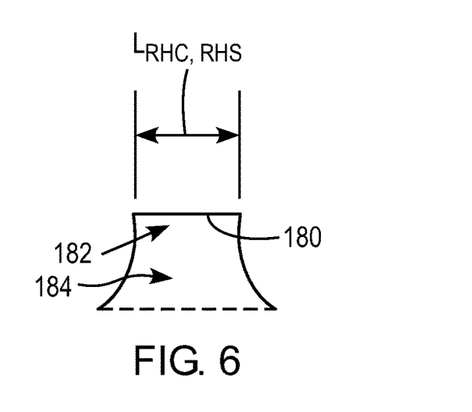
Figure 7:
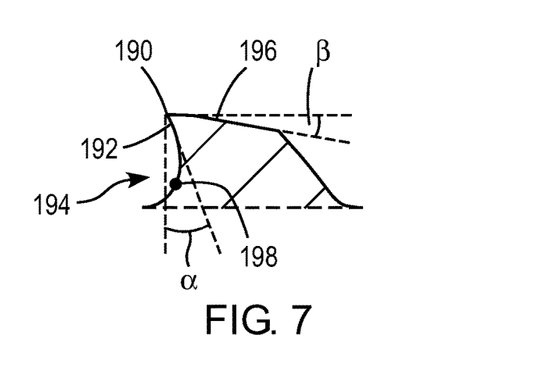
FIGS. 7 and 8 are magnified views showing, respectively, a cross-section of a second cutting edge along the line 7-7 (FIG. 7) and a side, surface view of view 8 (FIG. 8) shown in FIG. 2.
Figure 8:
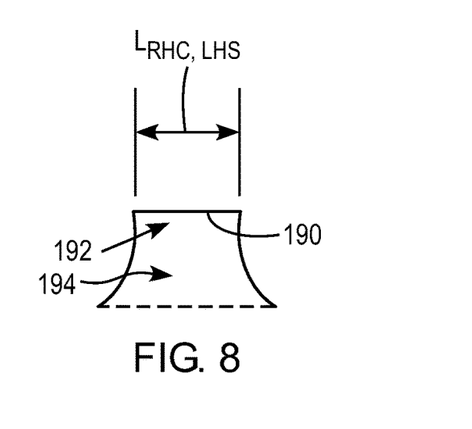

The right handed cutting edge (RHC) 180 on the right hand spiral (RHS) 120 has a first type of cutting edge geometry that is shown in FIGS. 5-6, which is a magnified view showing the cross-section of the cutting edge along the lines 5-5 shown in FIG. 2 and a side, surface view of the cutting edge as seen in view 6 shown in FIG. 2. This cross-section at lines 5-5 is perpendicular to the helical axis of the right hand spiral 120. In the cross-section illustrated in FIG. 5, the cutting edge geometry for the right handed cutting edge (RHC) 180 on the right hand spiral (RHS) 120 includes the individual cutting edge 180, a rake surface 182 connected to a flute 184, and clearance surface 186. The right handed cutting edge (RHC) 190 on the left hand spiral (LHS) 130 has a second type of cutting edge geometry that is shown in FIGS. 7-8, which is a magnified view showing the cross-section of the cutting edge along the lines 7-7 shown in FIG. 2 and a side, surface view of the cutting edge as seen in view 8 shown in FIG. 2. This cross-section at lines 7-7 is perpendicular to the helical axis of the left hand spiral 130. In the cross-section illustrated in FIG. 7, the cutting edge geometry for the right handed cutting edge (RHC) 190 on the left hand spiral (LHS) 130 includes the individual cutting edge 190, a rake surface 192 connected to a flute 194, and clearance surface 196.

In exemplary embodiments, each type of cutting edge geometry has a positive rake angle (α) and a positive clearance angle (β). Typically, these angles range from greater than or equal to −10 degrees to less than or equal to +20 degrees, alternatively, +1 to +3 degrees. In exemplary embodiments, each type of cutting edge geometry has a flute. The flutes provide structure to transport chips formed in the removal of material by the cutting edge through and away from the cutting zone. The flutes have a radius of curvature (i.e., at a given point, the radius of a circle that mathematically best fits the curve at that point) at an apex 188,198 of the flute that is the same for the flute of the first type of cutting edge geometry and for the flute of the second type of cutting edge geometry.

In some embodiments, at corresponding locations along the respective spirals the cross-sections of the two types of cutting edges in FIGS. 5-6 and FIGS. 7-8 are mirror images of each other, reflective of the two cutting edges of the same handedness being on spirals of different handedness. The mirror-image quality of the two cutting edges are observable in FIGS. 5 and 7. However, although in FIGS. 5 and 7 the two types of the cutting edges have the same rake angles, clearance angles and flute geometries, in other embodiments the two types of cutting edges can have different rake angles, clearance angles and flute geometries (and, consequently, the two types of cutting edges are not mirror images of each other). Additionally, at corresponding locations along the respective spirals the side, surface view of the right handed cutting edge (RHC) on the right hand spiral (RHS) as seen in FIG. 6 has the same shape as the side, surface view of the right handed cutting edge (RHC) on the left hand spiral (RHS) as seen in FIG. 8. However, as with the cross-sectional shape, in other embodiments the side surface views of the cutting edges do not need to have the same shapes.

Exemplary rotatable, solid cutting tools have individual cutting edges that are the same handedness on the right hand spiral (RHS) and on left hand spiral (LHS). FIGS. 1-8 illustrate a rotatable, solid cutting tool having individual cutting edges that are right handed cutting edges (RHC) on the right hand spiral (RHS) and on left hand spiral (LHS); FIGS. 9-16 illustrate a rotatable, solid cutting tool having individual cutting edges that are left handed cutting edges (LHC) on the right hand spiral (RHS) and on left hand spiral (LHS).

Figure 9:
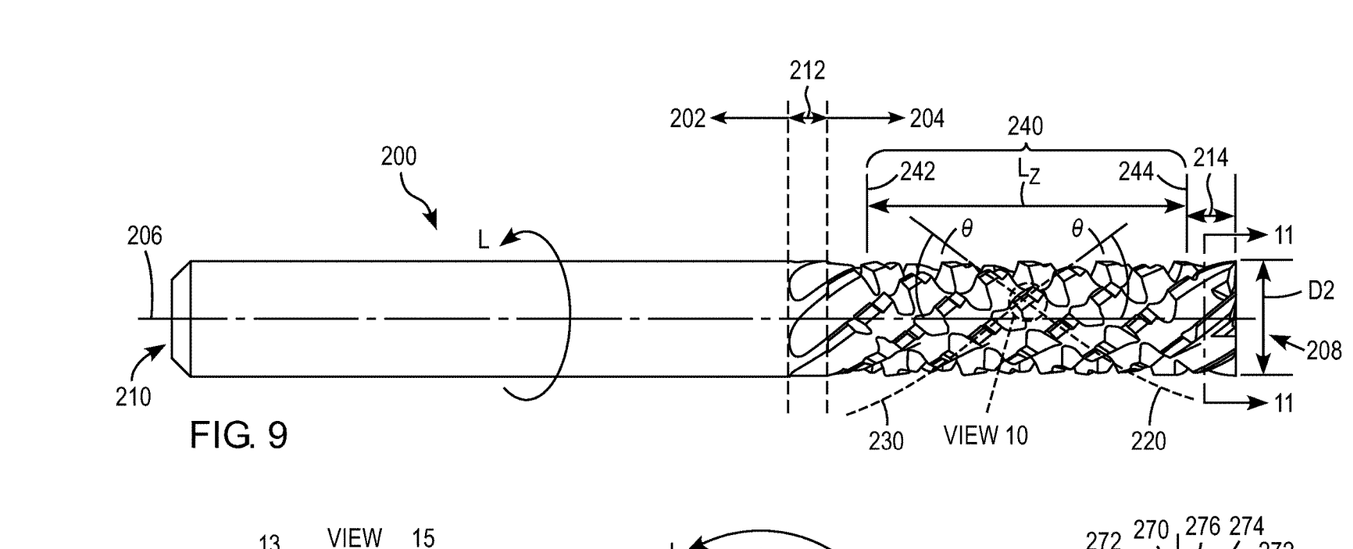
FIG. 9 shows a side view of a second exemplar embodiment of a cutting tool for both trim and rout operations of materials with two types of cutting features that extend the full length of the cutting zone and with a plain end point type (also sometimes called a flat end point type or non-cutting end type).

Turning now to the embodiment of a rotatable, solid cutting tool having individual cutting edges that are left handed cutting edges (LHC) on the right hand spirals (RHS) and on left hand spirals (LHS), FIG. 9 illustrates an exemplar rotatable, solid cutting tool 200 in the form of a rout and trim cutter. The exemplar cutting tool 200 comprises a solid body including a shank portion 202 and a cutting portion 204. The cutting portion 204 and shank portion 202 are sequentially arranged along a longitudinally-extending axis of rotation 206 of the solid body with the cutting portion 204 toward a front end 208 of the cutting tool 200 and the shank portion 202 toward a rear end 210 of the cutting tool 200. In the FIG. 9 embodiment (and other figures related to FIG. 9), the solid cutting tool 200 has its features arranged for left hand rotation (L) of the tool 200 about the longitudinal rotation axis 206 of the cutting tool 200.

The shank portion 202 is cylindrical with constant diameter along its axial length. Typically, the shank portion 202 has a smooth surface along a majority of the axial length. While the diameter of the shank portion 202 can be any suitable size for the intended machining operation, typical diameters are ⅛ inch to ½ inch or 6-12 mm, alternatively, ⅜ inch or 10 mm. Additionally, an optional mounting feature can be included at the rear end 210 of the cutting tool 200. Mounting features can include structures to mate or install the cutting tool in a machine tool, such as a CNC machine, for use in machining workpieces. As one example, the mounting feature can be flat surfaces arranged as an n-sided shape, e.g., a triangle, a quadrilateral, a pentagram and a hexagon, or other suitable shape that can be held in the jaws of a chuck.

The cutting portion 204 is axially forward of the shank portion 202. Typically, the cutting portion 204 is sequentially adjacent to the shank portion 202, although an optional transition area 212 may be located between the shank portion 202 and the cutting portion 204 and by which the shank portion 202 joins with or transitions into the cutting portion 204. Thus, the cutting portion 204 extends from the shank portion 202 (and transition area 212, if present) forward toward a tip region 214 of the cutting tool 200 located at an axially distally forward end.

The transitions of the shank portion 202 into the cutting portion 204 can include transitions in size, such as diameter, as well as transitions in cutting features, such as the inclusion of one or more cutting features. The inclusion of one or more cutting features can include one or more of including fewer or more numbers of cutting features and including smaller or larger sizes of cutting features, both of which can be included as a function of axial position. If present, the transitions in number and size of cutting features will typically increase as position in the transition area 212 moves axially forwarded from the shank portion 202 to the cutting portion 204, while transitions in size, such as diameter, will typically increase as position in the transition area 212 moves axially rearward from the cutting portion 204 to the shank portion 202.

Figure 10:
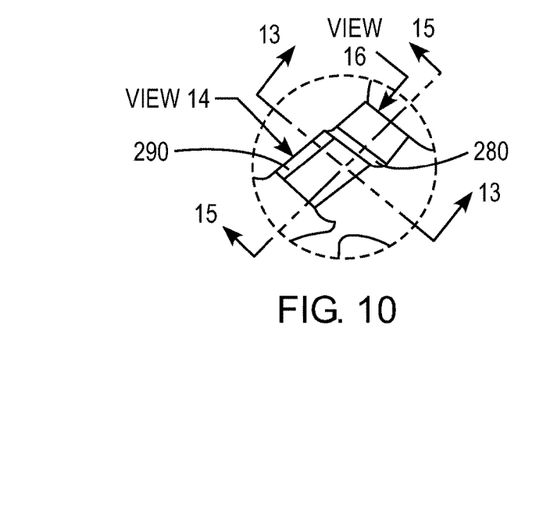
FIG. 10 shows, in a magnified surface view, details of the cutting teeth of the two types of cutting features on the cutting tool in FIGS. 9.

Returning to the cutting portion 204, the cutting portion 204 has a circumference that includes two types of cutting features. A first type of cutting feature includes a right hand spiral (RHS) 220 with an interrupted cutting edge (ICE). A second type of cutting feature includes a left hand spiral (LHS) 230 with an interrupted cutting edge (ICE). FIG. 10 is a magnified side view of a portion of the cutting tool in FIG. 9 and shows details of the first type of cutting feature and second type of cutting feature. The right hand spiral (RHS) 220 and left hand spiral (LHS) 230 are both helicoidal structures that extend, respectively, right or left around the circumference of the cutting tool 200 (looking down the axis of rotation 206 from the rear end 210 of the cutting tool toward the forward end 208), i.e., a right hand spiral (RHS) is a clockwise helicoidal structure and a left hand spiral (LHS) is a counter-clockwise helicoidal structure.

The helicoidal structures of the right hand spiral (RHS) 220 and left hand spiral (LHS) 230 have a pitch in opposite directions and intersect each other at periodic locations as the right hand spiral (RHS) 220 and left hand spiral (LHS) 230 cross. At the intersection points (an example of which is shown in FIG. 10), the structure of a first of the spirals occupies the space in the second of the spirals that would otherwise be the cutting features in that space, i.e., the cutting edge, the rake surface and the flute space below the rake surface, resulting in there being an interruption in the cutting edges formed on the respective spirals at the intersection point. The interruption or absence of the cutting edges is periodic along the length of the respective spirals and results in an interrupted cutting edge (ICE). An interrupted cutting edge (ICE) is a cutting edge that is non-continuous along the length of the right hand spiral (RHS) 220 or left hand spiral (LHS) 230 and includes a plurality of individual cutting edges that are separated from each other along the spiral. Here, the cutting edge is, alternately, in sequence along the length of the spiral: an individual cutting edge—an intersection point without a cutting edge—an individual cutting edge—an intersection point without a cutting edge—and so forth. Both the right hand spiral (RHS) 220 and left hand spiral (LHS) 230 have an interrupted cutting edge (ICE) as their respective cutting edge.

The portion of the tool in which the overlap of the right hand spiral (RHS) 220 and left hand spiral (LHS) 230 occurs defines a cutting zone 240. For example, and as shown in FIG. 9, the axially rearwardmost intersection point of the right hand spiral (RHS) 220 and left hand spiral (LHS) 230 defines a rearward boundary 242 and the axially forwardmost intersection point of the right hand spiral (RHS) 220 and left hand spiral (LHS) 230 defines a forward boundary 242. The axially rearwardmost intersection point and the axially forwardmost intersection point are axially separated by a length ($L_Z$) (the length measured in a direction parallel to the longitudinally-extending axis of rotation 206 of the solid body), and the cutting zone 240 between the rearward boundary 242 and the forward boundary 244 also has length ($L_Z$). In addition, because of the helicoidal nature of the right hand spiral (RHS) 220 and left hand spiral (LHS) 230, the axially rearwardmost intersection point and the axially forwardmost intersection point may not be in the same circumferential position (relative to a cross-section of the solid body perpendicular to the longitudinally-extending axis of rotation of the solid body), but rather may be at different circumferential positions. As such, the axially rearwardmost intersection point and the axially forwardmost intersection point may not both be visible at the same time in a side view such as FIG. 9.

In exemplary embodiments, the length ($L_Z$) of the cutting zone 240 between the rearward boundary 242 and the forward boundary 244 has a value that is related to the diameter (D2) of the cutting tool 200. For example, the length ($L_Z$) of the cutting zone 240 between the rearward boundary 242 and the forward boundary 244 can range from (1×diameter of cutting tool) to (10×diameter of cutting tool), alternatively (6×diameter of cutting tool). The diameter (D2) of the cutting tool 200 and the length of the cutting portion 204 and cutting zone 240 can be any suitable size for the intended machining operation. Typical diameters for the cutting tool are ⅛ inch to ½ inch or 6-12 mm, alternatively, ⅜ inch or 10 mm. While the range of sizes of the diameter for the cutting portion 204 may be the same as the range of sizes of the diameter of the shank potion 202, the diameter of the cutting portion 204 can be the same as or be different from the diameter of the shank portion 202. In the later case, then the length ($L_Z$) of the cutting zone 240 between the rearward boundary 242 and the forward boundary 244 can range from (1×diameter of cutting tool in the cutting zone) to (10×diameter of cutting tool in the cutting zone), alternatively (6×diameter of cutting tool in the cutting zone).

Figure 11:
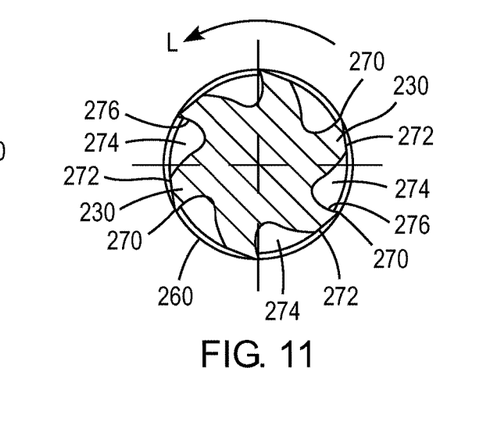
FIG. 11 is an axial view in a first direction down the longitudinal rotation axis of the cutting tool in FIG. 9 showing the cross-section of the cutting tool along line 11-11 shown in FIG. 9.

The right hand spiral (RHS) 220 and left hand spiral (LHS) 230 extend over an axial length of the tool 200 commensurate with the cutting zone 240. Additionally, in the FIG. 9 embodiment, the right hand spiral (RHS) 220 extends axially rearward of the rearward boundary 242 and the depth of the flute of the right hand spiral (RHS) 220 reduces in depth as the right hand spiral (RHS) 220 moves axially rearward from the rearward boundary 242. This produces a suitable rake angle at the end of the right hand spiral (RHS) 220 in the rearward portion of the cutting zone 240 to efficiently cut material with the cutting edge of the right hand spiral (RHS) 220 and also to efficiently transport cut material. Typically, customer specific characteristics can be accommodated and can depend on the workpiece external layers, machine capabilities, suction capability, and customer preferences. Also additionally, the left hand spiral (LHS) 230 extends axially forward of the forward boundary 244 into the tip region 214 located at an axially distally forward end of the cutting tool 200. This area of the cutting edge is typically used to drill through the workpiece material. The right hand spiral (RHS) 220 does not extend axially forward of the forward boundary 244 because if it were to do so, the right hand spiral (RHS) 220 would interfere with or remove the cutting features of the left hand spiral (LHS) 230 in the tip region 214 and at the axial distally forward end of the cutting tool 200 with attendant detrimental effects on cutting performance and chip evacuation performance of the tip region 214 during machining operations. In one example, the length of the tip region 214 from the forward boundary 242 to the forward end 208 of the cutting tool 200 is 2 to 6 mm. FIG. 11 is a cross-section along line 11-11 in FIG. 9 and shows that, in this part of the cutting tool axially forward of the forward boundary 244, only the left hand spirals (LHS) 230 and associated cutting features are present.

The individual cutting edges in both the cutting zone 240 and in the part of the cutting tool 200 axially forward of the forward boundary 244 are located on an outer diameter surface 260 of the radial cross-section of the tool 200. In FIG. 11, individual left hand spirals (LHS) 230 are illustrated each with a cutting edge 270 at a radially outermost diameter 260 of the cutting tool 200 and followed by clearance surface 272 that is radially inward from the outer diameter surface 260 of the radial cross-section of the tool 200. Following the clearance surface 272, the surface of the left hand spiral 230 transitions into the flute 274 for the following (relative to the direction of rotation for machining operations) cutting edge. The surface of the flute 274 transitions into a rake surface 276 that meets the clearance surface 272 of the following (relative to the direction of rotation for machining operations) left hand spiral (LHS) to form the cutting edge of the following (relative to the direction of rotation for machining operations) left hand spiral (LHS).

Figure 12:
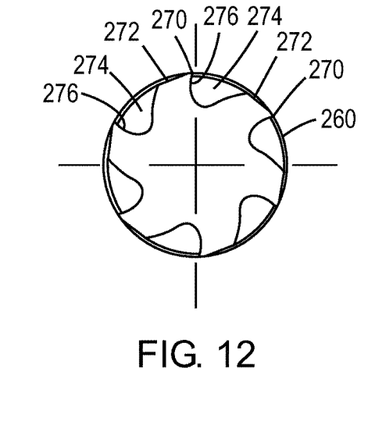
FIG. 12 is an axial view in a second direction down the longitudinal rotation axis of the cutting tool in FIG. 9 showing the features of the plain end point type.

FIG. 12 is axial view down the longitudinal rotation axis 206 of the cutting tool 200 in FIG. 9 as seen from the axially distally forward end 208 and showing the features of a plain end point type. In the FIG. 12 view, the individual cutting edges 270 (which are left handed cutting edges (LHC) on left hand spirals (LHS)) are each located on an outer diameter surface 260 of the radial cross-section of the tool and this outer diameter surface 260 is on a cylindrically-shaped circumference. For a tool rotating in the counter-clockwise direction during operation (which is the clockwise direction in FIG. 12), each individual spiral has a cutting edge geometry that includes the individual cutting edge 270 followed by clearance surface 272 that is radially inward from the outer diameter surface 260 of the radial cross-section of the tool. Following the clearance surface 272, the cutting edge geometry transitions into the flute 274 for the following (relative to the direction of rotation for machining operations) cutting edge. The surface of the flute 274 transitions into a rake surface 276 that meets the clearance surface 272 of the cutting edge geometry of the following (relative the direction of rotation for machining operations) left hand spiral (LHS) to form the cutting edge 270 in the cutting edge geometry of the following (relative to the direction of rotation for machining operations) left hand spiral (LHS).

For ease of view, not all features of each spiral are labeled with reference numerals in FIGS. 11 and 12.

Each individual cutting edge has a length on the outer circumference surface of the tool. FIGS. 13-16 show, in a magnified surface view or cross-sectional view, details of cutting teeth on the cutting tool in FIG. 9 in the views as indicated in FIG. 10. The illustrated cutting teeth are a left handed cutting edge 280 on a right hand spiral 220 (LHC-RHS) (cross-section 15-15 and view 16 shown in corresponding FIGS. 15-16) and a left handed cutting edge 290 on a left hand spiral 230 (LHC-LHS) (cross-section 13-13 and view 14 shown in corresponding FIGS. 13-14). As a surface view, FIGS. 10-16 illustrate that both the left handed cutting edge 280 on the right hand spiral 220 (LHC-RHS) and the left handed cutting edge 290 on the left hand spiral 230 (LHC-LHS) are contained in the cylindrically-shaped circumferential surface of the cutting tool corresponding to the outer diameter surface of the radial cross-section of the tool. As observable from the figures, the individual cutting edges 280,290 also are each approximately parallel (90°±3°) to the helicoidal axis of the respective right hand spiral (RHS) 220 or left hand spiral (LHS) 230 and have a length along an outer circumference of the cutting tool 200. In exemplar embodiments, the length of each of the plurality of left handed cutting edge on the right hand spiral ($L_{LHC, RHS}$) and the length of each of the plurality of left handed cutting edges on the left hand spiral ($L_{LHC, LHS}$) are equal within a given tolerance band, such as within ±2%, alternatively within ±1%.

Both the right hand spiral (RHS) 220 and the left hand spiral (LHS) 230 have a helix angle, which is the angle formed between a line drawn parallel to the axis of the drill 106 and the leading edge of the land. This helix angle is generally represented by helix angle (θ) in FIG. 9. In exemplary embodiments, the helix angle (θ) for both the right hand spiral (RHS) 220 and the left hand spiral (LHS) 230 can range from 10 degrees to 60 degrees, alternatively, 40±10 degrees, 40±2 degrees or 40±1 degrees. The smaller the spiral to spiral variation, the more precise the cutting tool can cut and the better the surface finish of the cut. Although the helix angle (θ) for the right hand spiral (RHS) 220 can be the same as the helix angle (θ) for the left hand spiral (LHS) 230, it does not have to be.

Collectively for both the right hand spiral (RHS) 220 and the left hand spiral (LHS) 230, the respective individual cutting edges 280,290 are axially staggered helically around the circumference of the cutting zone 240. The staggering is a result of the bi-directional spirals, i.e., the RHS and LHS, and the interrupted cutting edges that are present in the cutting tool. Because of the staggering, in each radial cross-section along the axial length of the cutting zone 240, there is both at least one left handed cutting edge 280 on a right hand spiral 220 (LHC-RHS) and also at least one left handed cutting edge 290 on a left hand spiral 230 (LHC-LHS). The actual number of left handed cutting edges on a right hand spiral (LHC-RHS) and left handed cutting edges on a left hand spiral (LHC-LHS) will vary depending on the number of right hand spirals and left hand spirals and their helix angles and spacing.

Moreover, in addition to be axially staggered, at least a portion of a left handed cutting edge on a first spiral overlaps at least a portion of left handed cutting edge on a second, consecutively adjacent, spiral, where the first spiral and the second spiral are of the same type, i.e., the spirals with the overlapping cutting edges are of the same type of cutting feature—either both right hand spirals or both left hand spirals. The overlap typically occurs between an axially rearwardmost portion of a first left handed cutting edge on a first spiral and an axially forwardmost portion of a second left handed cutting edge on a second spiral (the first and second spirals being either both right hand spirals or both left hand spirals), where the two spirals are consecutively adjacent (amongst those on the same type of cutting feature) and, in a radial cross-section containing the overlapping portions of the two cutting edges, the first spiral is located to the right of or clockwise from the second spiral (looking down the axis of rotation from the rear end of the cutting tool toward the axial distally forward end).

Exemplary rotatable, solid cutting tools can have a different number of right hand spirals (RHS) and left hand spirals (LHS), which allows distribution of cutting forces, heat, and chip evacuation. Having a different number of right hand spirals (RHS) and left hand spirals (LHS) can be present depending on machine limitations, rigidness, and workpiece variations to achieve desired results for cutting performance.

Figure 13:
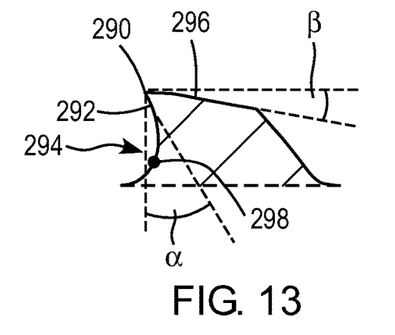
FIGS. 13 and 14 are magnified views showing, respectively, a cross-section of a first cutting edge along the line 13-13 (FIG. 13) and a side, surface view of view 4 (FIG. 14) shown in FIG. 10.
Figure 14:
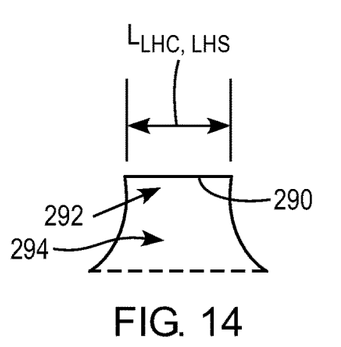
Figure 15:
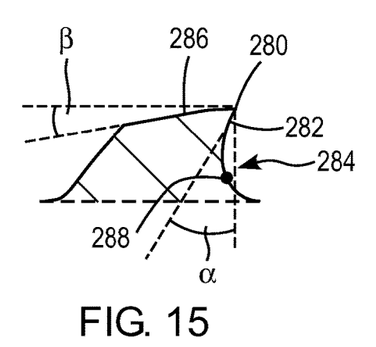
FIGS. 15 and 16 are magnified views showing, respectively, a cross-section of a second cutting edge along the line 15-15 (FIG. 15) and a side, surface view of view 16 (FIG. 16) shown in FIG. 10.
Figure 16:
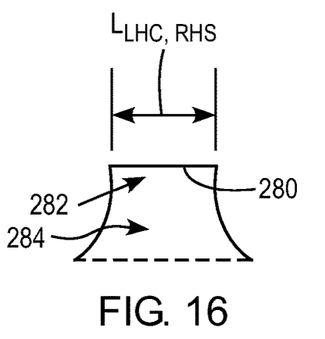

The left handed cutting edge (RHC) 280 on the right hand spiral (RHS) 220 has a first type of cutting edge geometry that is shown in FIGS. 15-16, which is a magnified view showing the cross-section of the cutting edge along the lines 15-15 shown in FIG. 10 and a side, surface view of the cutting edge as seen in view 16 shown in FIG. 10. This cross-section at lines 15-15 is perpendicular to the helical axis of the right hand spiral (RHS) 220. In the cross-section illustrated in FIG. 15, the cutting edge geometry for the left handed cutting edge (LHC) 280 on the right hand spiral (RHS) 220 includes the individual cutting edge 280, a rake surface 282 connected to a flute 284, and clearance surface 286. The left handed cutting edge (LHC) 290 on the left hand spiral (LHS) 290 has a second type of cutting edge geometry that is shown in FIGS. 13-14, which is a magnified view showing the cross-section of the cutting edge along the lines 13-13 shown in FIG. 10 and a side, surface view of the cutting edge as seen in view 14 shown in FIG. 10. This cross-section is perpendicular to the helical axis of the left hand spiral (LHS) 230. In the cross-section illustrated in FIG. 13, the cutting edge geometry for the left handed cutting edge (LHC) 290 on the left hand spiral (LHS) 230 includes the individual cutting edge 290, a rake surface 292 connected to a flute 294 and clearance surface 296.

In exemplary embodiments, each type of cutting edge geometry has a positive rake angle (α) and a positive clearance angle (β). Typically, these angles range from greater than or equal to −10 degrees to less than or equal to +20 degrees, alternatively, +1 to +3 degrees. In exemplary embodiments, each type of cutting edge geometry has a flute. The flutes provide structure to transport chips formed in the removal of material by the cutting edge through and away from the cutting zone. The flutes have a radius of curvature (i.e., at a given point, the radius of a circle that mathematically best fits the curve at that point) at an apex 288,298 of the flute that is the same for the flute of the first type of cutting edge geometry and for the flute of the second type of cutting edge geometry.

In some embodiments, at corresponding locations along the respective spirals the cross-sections of the two types of cutting edges in FIGS. 13-14 and FIGS. 15-16 are mirror images of each other, reflective of the two cutting edges of the same handedness being on spirals of different handedness. The mirror-image quality of the two cutting edges are observable in FIGS. 13 and 15. However, although in FIGS. 13 and 15 the two types of the cutting edges have the same rake angles, clearance angles and flute geometries, in other embodiments the two types of cutting edges can have different rake angles, clearance angles and flute geometries (and, consequently, the two types of cutting edges are not mirror images of each other). Additionally, at corresponding locations along the respective spirals the side, surface view of the left handed cutting edge (LHC) on the right hand spiral (RHS) as seen in FIG. 16 has the same shape as the side, surface view of the left handed cutting edge (LHC) on the left hand spiral (LHS) as seen in FIG. 14. However, as with the cross-sectional shape, in other embodiments the side surface views of the cutting edges do not need to have the same shapes.

Figure 17A:
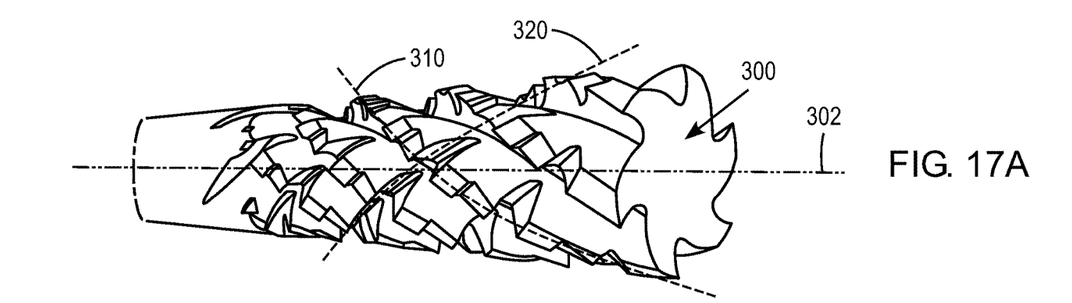
FIGS. 17A-C show variations in the front end surface of the cutting tool (in this case, the cutting tool of FIGS. 1-8) in offset perspective view in which a plain end point type (FIG. 17A), an endmill point type (FIG. 17B), and a drill point type (FIG. 17C) are shown.
Figure 17B:
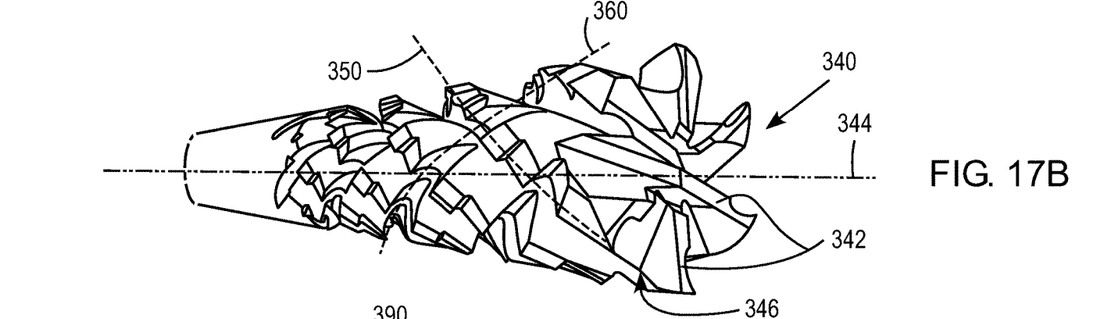
Figure 17C:
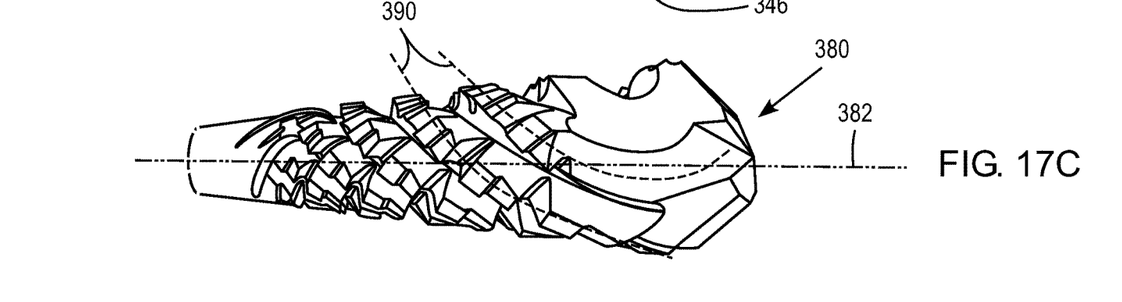

The structure and features of the tip and of the axial distally forward end of the cutting tools can have one of various optional shapes. These structure and features can include a plain end point, an endmill point, and a drill point. Each type of type can be used with each cutting tool type, whether a cutting tool with right handed cutting edges for right hand rotation (as in FIGS. 1-8) or a cutting tool with left handed cutting edges for left hand rotation (as in FIGS. 9-16). FIGS. 17A-C show examples of a cutting tool with a plain end point (FIG. 17A), an endmill point (FIG. 17B), and a drill point (FIG. 17C).

In the plain end point embodiment (FIG. 17A), the axial distally forward end 300 of the cutting tool is planar in a plane perpendicular to the longitudinally-extending axis of rotation 302 of the solid body. The planar, axial distally forward end 300 does not include any cutting features. For example, neither the first type of cutting feature 310 nor the second type of cutting feature 320 extend onto the planar, axial distally forward end 300. Cutting tools with a plain end point are typically used for trim and routing, but are not typically used to drill through or create steps in workpieces.

In the end mill point embodiment (FIG. 17B), the axial distally forward end 340 of the cutting tool incorporates end cutting edges 342 that extend radially from a longitudinally-extending axis of rotation 344 of the solid body (or from near the longitudinally-extending axis of rotation of the solid body). At the peripheral edge 346 of the axial distally forward end 340, the end cutting edges 342 meet and transition into the cutting edges of the cutting feature 350 of the cutting tool (whether a right hand spiral or a left hand spiral cutting feature) that has extended axially forwardly from the cutting zone and past the forward boundary. In the embodiment shown in FIG. 17B, the cutting feature 350 is a right hand spiral while the other cutting feature 360 of the end mill point embodiment is a left hand spiral, the cutting edges of which do not transition into the end cutting edges 342. An alternative embodiment would have left hand spiral cutting features transitioning into the end cutting edges 342 while the right hand spiral cutting features did not. The end cutting edges 342 have a dish angle (the angle formed by the end cutting edge and a plane perpendicular to the longitudinally-extending axis of rotation of the solid body). The dish angle can range from 0 to 15 degrees and helps to ensure that a flat surface is produced by the cutting tool. Cutting tools with an end mill point are typically used for trim and routing, can create steps in workpieces, and are also capable of drilling through workpieces.

In the drill point embodiment (FIG. 17C), the axial distally forward end 380 of the cutting tool has a conical or conical-like shape and cutting edges of the cutting feature 390 of the cutting tool (whether a right hand spiral or a left hand spiral cutting feature) extend axially forward from the cutting zone, past the forward boundary, and continue to extend up the angled sides of the axial distally forward end 380 of the cutting tool and converge at or near a longitudinally-extending axis of rotation 382 of the solid body. The axial distally forwardmost end 380 may be any one of a variety of configurations, including pointed, chiseled, faceted, and split. Cutting tools with a drill point are typically used for trim and routing and for drilling through workpieces, but are not typically used to create steps in workpieces.

The solid body is tungsten carbide (for example, H10F, H6F, or equivalent). Alternatively, the solid body is a steel (for example, High Speed Steel Grades M2 and M3) and includes a carbide coating (deposited by vapor deposition process such as CVD or PVD). Cutting tools with a solid body (also called solid cutting tools) are distinguished by the fact that all the necessary details, such as cutting edges (with the ensuing chip surface and clearance surface), chip evacuation channels, guide pads, flushing fluid channels, etc., are included in a solid body of a suitable material, such as cemented carbide, high speed steel, or the like. Solid cutting tools can be contrasted with non-solid cutting tools, which is a heterogeneous category and includes a plurality of different types of drills, such as indexable insert drills, loose top drills and drills having soldered cutting inserts, which have a common feature of the cutting edges required to carry out chip removal are included in particular wear parts, which are included in replaceable, indexable inserts, and in loose top drills that can be interconnected with a reusable drill or basic body. In this instance, the rotatable, solid cutting tool disclosed herein has a solid body preferably formed of solid carbide or formed of a steel and including a carbide coating.

Solid cutting tools can be manufactured by, for example, forming and grinding processes. One example manufacturing method includes forming a solid body (such as a rod or a near net shape body) of tungsten carbide, for example, by sintering processes; cutting the formed tungsten carbide to a desired length; grinding the cut tungsten carbide to a desired diameter; and grinding features of the cutting tool (such as flutes, rake surfaces, clearance surfaces, and other features of the cutting edge geometry).

The disclosed cutting tools can be used to machine workpieces of materials using suitable machining techniques. For example, an example machining process using the disclosed cutting tools can include selecting a cutting tool by diameter and length to achieve a desired machining result; installing the selected cutting tool into a holder of a machine tool and measuring for initial tool position; mounting a workpiece in the machine tool and measuring for initial workpiece position; operating the machine tool to rotate the cutting tool at a desired RPM; and engaging the workpiece with the rotating cutting tool to remove material from the workpiece and following a predetermined path at a set feed rate to form the workpiece into a desired shape.

Although the present invention has been described in connection with embodiments thereof, it will be appreciated by those skilled in the art that additions, deletions, modifications, and substitutions not specifically described may be made without departure from the spirit and scope of the invention as defined in the appended claims.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

What is claimed is:

1. A rotatable, solid cutting tool, comprising:
a solid body including a cutting portion and a shank portion,
wherein the cutting portion and shank portion are sequentially arranged along a longitudinally-extending axis of rotation of the solid body with the cutting portion toward a front end of the cutting tool and the shank portion toward a rear end of the cutting tool,
wherein the cutting portion includes a first type of cutting feature and a second type of cutting feature,
wherein the first type cutting features include a plurality of right hand spirals and the second type of cutting feature includes a plurality of left hand spirals,
wherein each of the plurality of right hand spirals includes an interrupted cutting edge having a plurality of individual cutting edges and each of the plurality of left hand spirals includes an interrupted cutting edge having a plurality of individual cutting edges,
wherein a longitudinal length of the cutting portion is defined by a length, in a direction parallel to the longitudinally-extending axis of rotation of the solid body, in which the plurality of right hand spirals intersect with the plurality of left hand spirals,
wherein individual cutting edges of each of the plurality of right hand spirals are axially staggered helically around a circumference of the cutting portion with respect to the individual cutting edges of each of the plurality of left hand spirals so that, at each axial position along an axial length of the cutting portion, each radial cross-section includes both at least one individual cutting edge on a right hand spiral and at least one individual cutting edge on a left hand spiral,
wherein individual cutting edges on each of the plurality of right hand spirals and the plurality of left hand spirals have a length along an outer circumference of the cutting tool,
wherein the length of the individual cutting edges of each of the plurality of right hand spirals equals the length of the individual cutting edges of each of the plurality of left hand spirals, and
wherein the plurality of left hand spirals extend axially rearward relative to a rearward boundary of the cutting portion and the plurality of right hand spirals extend axially forward relative to a forward boundary of the cutting portion.

2. The rotatable, solid cutting tool of claim 1, wherein the individual cutting edges on each of the plurality of right hand spirals and the plurality of left hand spirals have the same handedness.

3. The rotatable, solid cutting tool of claim 1, wherein the individual cutting edges on each of the plurality of right hand spirals are right handed cutting edges and the individual cutting edges on each of the plurality of left hand spirals are right handed cutting edges.

4. The rotatable, solid cutting tool of claim 1, wherein the individual cutting edges on each of the plurality of right hand spirals are left handed cutting edges and the individual cutting edges on each of the plurality of left hand spirals are left handed cutting edges.

5. The rotatable, solid cutting tool of claim 1, wherein there are a different number of right hand spirals and left hand spirals.

6. The rotatable, solid cutting tool of claim 1, wherein the longitudinal length of the cutting portion has a value that is proportional to the diameter of the cutting tool and ranges from (1×the diameter of the cutting tool) to (10×the diameter of the cutting tool).

7. The rotatable, solid cutting tool of claim 1, wherein individual right handed cutting edges of each of the plurality of right hand spirals of the first type of cutting feature have a first cutting edge geometry, and, in a cross-section perpendicular to a helical axis of the right hand spiral, the first cutting edge geometry includes the individual right hand cutting edge, a first rake surface connected to a first flute, and a first clearance surface.

8. The rotatable, solid cutting tool of claim 7, wherein individual right handed cutting edges of each of the plurality of left hand spirals of the second type of cutting feature have a second cutting edge geometry, and, in a cross-section perpendicular to a helical axis of the left hand spiral, the second cutting edge geometry includes the individual right hand cutting edge, a second rake surface connected to a second flute, and a second clearance surface.

9. The rotatable, solid cutting tool of claim 8, wherein the cross-section of the first cutting edge is a mirror image of the cross-section of the second cutting edge geometry.

10. The rotatable, solid cutting tool of claim 8, wherein a radius of curvature at an apex of the first flute is the same as a radius of curvature at an apex of the second flute.

11. The rotatable, solid cutting tool of claim 8, wherein the first clearance surface and the second clearance surface each have a positive clearance angle.

12. The rotatable, solid cutting tool of claim 1, wherein the circumference of the cutting portion has a cylindrical shape.

13. The rotatable, solid cutting tool of claim 1, wherein the front end of the rotatable cutting tool includes one of a plain end point, an endmill point, and a drill point.

14. The rotatable, solid cutting tool of claim 1, wherein the solid body is formed of a solid carbide.

15. The rotatable, solid cutting tool of claim 1, wherein the solid body is formed of a steel and includes a carbide coating.

16. A method to manufacture the rotatable, solid cutting tool of claim 1, the method comprising:
forming the solid body of tungsten carbide;
cutting the solid body to a desired length;
grinding the solid body to a desired diameter; and
grinding the first type of cutting feature and the second type of cutting feature into the cutting portion of the cutting tool,
wherein grinding forms one or more of a flute, a rake surface, and a clearance surface of the individual cutting edges.

17. The method of claim 16, wherein the solid body of tungsten carbide is formed by a sintering process that produces the solid body in near net shape form.

18. A method to machine a workpiece made of carbon fiber reinforced plastic, the method comprising:
installing the rotatable, solid cutting tool of claim 1 into a holder of a machine tool and measuring for initial tool position;

mounting a workpiece in the machine tool and measuring for initial workpiece position;
operating the machine tool to rotate the cutting tool about the longitudinally-extending axis of rotation at a desired RPM;
engaging the workpiece with the rotating cutting tool to remove material from the workpiece; and
translating the rotating cutting tool relative to the workpiece along predetermined path at a set feed rate to form the workpiece into a desired shape.

19. A rotatable, solid cutting tool, comprising:
a solid body including a cutting portion and a shank portion,
wherein the cutting portion and shank portion are sequentially arranged along a longitudinally-extending axis of rotation of the solid body with the cutting portion toward a front end of the cutting tool and the shank portion toward a rear end of the cutting tool,
wherein the cutting portion includes a first type of cutting feature and a second type of cutting feature,
wherein the first type cutting features include a plurality of right hand spirals and the second type of cutting feature includes a plurality of left hand spirals,
wherein each of the plurality of right hand spirals includes an interrupted cutting edge having a plurality of individual cutting edges and each of the plurality of left hand spirals includes an interrupted cutting edge having a plurality of individual cutting edges,
wherein a longitudinal length of the cutting portion is defined by a length, in a direction parallel to the longitudinally-extending axis of rotation of the solid body, in which the plurality of right hand spirals intersect with the plurality of left hand spirals,
wherein individual cutting edges of each of the plurality of right hand spirals are axially staggered helically around a circumference of the cutting portion with respect to the individual cutting edges of each of the plurality of left hand spirals so that, at each axial position along an axial length of the cutting portion, each radial cross-section includes both at least one individual cutting edge on a right hand spiral and at least one individual cutting edge on a left hand spiral,
wherein individual cutting edges on each of the plurality of right hand spirals and the plurality of left hand spirals have a length along an outer circumference of the cutting tool,
wherein the length of the individual cutting edges of each of the plurality of right hand spirals equals the length of the individual cutting edges of each of the plurality of left hand spirals, and
wherein the plurality of left hand spirals extend axially forward relative to a forward boundary of the cutting portion.

20. A rotatable, solid cutting tool, comprising:
a solid body including a cutting portion and a shank portion,
wherein the cutting portion and shank portion are sequentially arranged along a longitudinally-extending axis of rotation of the solid body with the cutting portion toward a front end of the cutting tool and the shank portion toward a rear end of the cutting tool,
wherein the cutting portion includes a first type of cutting feature and a second type of cutting feature,
wherein the first type cutting features include a plurality of right hand spirals and the second type of cutting feature includes a plurality of left hand spirals,
wherein each of the plurality of right hand spirals includes an interrupted cutting edge having a plurality of individual cutting edges and each of the plurality of left hand spirals includes an interrupted cutting edge having a plurality of individual cutting edges,
wherein a longitudinal length of the cutting portion is defined by a length, in a direction parallel to the longitudinally-extending axis of rotation of the solid body, in which the plurality of right hand spirals intersect with the plurality of left hand spirals,
wherein individual cutting edges of each of the plurality of right hand spirals are axially staggered helically around a circumference of the cutting portion with respect to the individual cutting edges of each of the plurality of left hand spirals so that, at each axial position along an axial length of the cutting portion, each radial cross-section includes both at least one individual cutting edge on a right hand spiral and at least one individual cutting edge on a left hand spiral,
wherein individual cutting edges on each of the plurality of right hand spirals and the plurality of left hand spirals have a length along an outer circumference of the cutting tool,
wherein the length of the individual cutting edges of each of the plurality of right hand spirals equals the length of the individual cutting edges of each of the plurality of left hand spirals, and
wherein the plurality of right hand spirals extend axially rearward relative to a rearward boundary of the cutting portion and the plurality of left hand spirals extend axially forward relative to a forward boundary of the cutting portion.

* * * * *